US005771341A

United States Patent [19]
Huddy

[11] Patent Number: 5,771,341
[45] Date of Patent: Jun. 23, 1998

[54] GRAPHICS APPARATUS AND METHOD FOR DIVIDING PARAMETRIC SURFACE PATCHES DEFINING AN OBJECT INTO POLYGONS

[75] Inventor: Richard Stirling Huddy, Guildford, United Kingdom

[73] Assignee: Canon Kabushiki Kaisha, Tokyo, Japan

[21] Appl. No.: 718,650

[22] Filed: Sep. 26, 1996

Related U.S. Application Data

[63] Continuation of Ser. No. 582,016, Jan. 2, 1996, abandoned, which is a continuation of Ser. No. 143,121, Oct. 29, 1993, abandoned.

[30] Foreign Application Priority Data

Nov. 6, 1992 [GB] United Kingdom .................. 9223314

[51] Int. Cl.⁶ .................................................. G06T 15/00
[52] U.S. Cl. .......................................... 395/119; 395/142
[58] Field of Search ............................. 395/118–20, 123, 395/125, 129, 141–2, 501

[56] References Cited

U.S. PATENT DOCUMENTS 5,353,389  10/1994  Fiasconaro .............................. 395/119

FOREIGN PATENT DOCUMENTS

| 0314335 | 8/1989 | European Pat. Off. . |
| 0366463 | 5/1990 | European Pat. Off. . |
| 0 481 463 A2 | 4/1992 | European Pat. Off. . |

OTHER PUBLICATIONS

Chou, Jin J., "Data Reduction Using Cubic Ration B–Splines," *IEEE Computer Graphics and Applications Magazine*, pp. 60–68, (May 1992).

Chao, Philip C. et al, "A VLSI Architecture for Bicubic Surface Patch Image Generation," *Computers and Communications, 1989 Int'l. Phoenix Conference*, pp.54–58, (1989).

Gorowara, Krishan K., "A Problem on Bezier Curvers and Bezier Surfaces," *National Aerospace and Electronics*, pp. 698–701, (1990).

Yanilmaz, Mahmet et al, "Beizer Formulation of Multistep Algorithms," *Circuits and Systems, 1990 International Symposium*, pp. 2696–2700, (1990).

Lau, K. H., "Conditions for avoiding loss of geometric continuity on spline curves," *Comput. Aided Geom. Design*, Computer Aided Geometric Design, vol. 5, No. 3, pp. 209–214, ISSN:0167–8396, (1988).

Sederberg et al., "Approximation by Interval Bezier Curves", IEEE Computer Graphics and Applications Sep. 1992, vol. 12, Issue 5.

Yong et al, "On Mapping Bezier Curves and Surface Subdivision Algorithm with Adjacent Constraint Parallel", Parallel Processing & Distributed Proc. 1991.

Yu, An Efficient Geometric Curve Fitting Technique, Computer & Communication Systems 1989.

Creation and Smooth–Shading of Steiner Patch Tessellations: by D.E. Breen; Proceedings Falljoint Computer Conference; Nov. 2, 1986, Dallas, Texas, pp. 931–940.

*Primary Examiner*—Heather R. Herndon
*Assistant Examiner*—Rudolph J. Buchel
*Attorney, Agent, or Firm*—Fitzpatrick, Cella, Harper & Scinto

[57] ABSTRACT

Before being used in an interactive graphics environment, control points defining Bezier curves are processed to determine the curvature of the patch. This value is then used to determine the number of recursive iterations required to divide the patch into a plurality of renderable polygons. A value is determined by considering the cosine of the turning angle between vectors connecting the control points of Bezier curves. For each vector connecting the control points a respective vector of unit length is calculated. Cosine values are then calculated by producing the dot product of said unit vectors. Cosine values for two turning angles are calculated for each Bezier curve and a value indicative of curvature is determined by adding these cosine values together. The curvature of the whole patch is taken to be equivalent to the curvature of the most curved curve defining the patch.

32 Claims, 8 Drawing Sheets

$$x = (1-t)^3 x_A + 3t(1-t)^2 x_B + 3t^2(1-t) x_C + t^3 x_D$$

$$y = (1-t)^3 y_A + 3t(1-t)^2 y_B + 3t^2(1-t) y_C + t^3 y_D$$

$$z = (1-t)^3 z_A + 3t(1-t)^2 z_B + 3t^2(1-t) z_C + t^3 z_D$$

For t: $0 \leq t \leq 1$ $$\underline{AB} \cdot \underline{BC} = x_{\underline{AB}}x_{\underline{BC}} + y_{\underline{AB}}y_{\underline{BC}} + z_{\underline{AB}}z_{\underline{BC}}$$

$$= \cos T_1$$

GRAPHICS APPARATUS AND METHOD FOR DIVIDING PARAMETRIC SURFACE PATCHES DEFINING AN OBJECT INTO POLYGONS

This application is a continuation of application Ser. No. 08/582,016, filed Jan. 2, 1996, now abandoned, which is a continuation of application Ser. No. 08/143,121, filed Oct. 29, 1993, now abandoned.

FIELD OF THE INVENTION

The present invention relates to apparatus and methods for processing image data.

In particular, the present invention relates to apparatus and methods for displaying three-dimensional images. Furthermore, the present invention relates to an interactive graphics system in which objects are defined by areas and said areas are split into a plurality of polygons.

BACKGROUND OF THE INVENTION

Graphics systems are known in which two-dimensional images are generated in response to data defining elements within a three-dimensional space. The final two-dimensional result may consist of a very large number of colored picture elements (pixels) which may be viewed on a monitor or printed onto an image carrying medium.

In interactive systems arranged to generate data representing a three-dimensional space, objects appear to move within three-dimensional space in response to input commands. Thus, in such systems, a machine is required to render a two-dimensional image from data representing a three-dimensional space repeatedly, as the position and/or orientation of objects, light sources and view position change in response to input commands. Typically, in an interactive environment, a machine is required to produce output images at a rate of between five to twenty per second.

Traditional machines of this type require a significant amount of computational overhead and, in the past, this requirement has placed significant constraints on system availability. Many techniques have been developed on behalf of the present Assignee, some of which provide the basis for patent applications assigned to the present Assignee, which reduce the computational overhead of an interactive three-dimensional graphics system. These techniques allow three-dimensional interactive graphic systems to be produced without requiring purpose built hardware.

In a system of this type, object geometry undergoes transformations in response to transformation matrices. The geometry is defined by the vertices of a plurality of polygons and, in order to effect a transformation of the object, it is necessary to perform the matrix transformation on each of said vertices. Thus, when a high number of polygons are present, a significant amount of computation is required in order to transform all of the object forming vertices.

As an alternative to transforming vertices, it is also known to transform complete areas of an object which are then rendered into polygons after the transformation has taken place. With this approach, it is not necessary to transform a large number of vertices, provided that sufficient data can be transformed to allow the object to be reconstituted after the transformation has taken place.

An area defined by Bezier curves and referred to as a Bezier patch is a suitable area for this type of transformation. Thus, a relatively large patch, capable of defining a large range of curves, may be identified by specifying sixteen control points, wherein each control point is either an end control point or an intermediate curvature control point for two of the eight Bezier curves defining the patch. A Bezier curve has finite length and is terminated at each of its ends by end control points. The intermediate curvature control points define the extent of curvature which occurs between the end points but the actual curve does not pass through the intermediate curvature control points. It should be noted that a Bezier patch defines a three-dimensional plane and the control points of the patch may be positioned anywhere within three-dimensional space. However, to effect rendering, it is necessary to divide the plane into polygons which are substantially flat or at least flat enough to effect a convincing render.

To effect rendering, it is known to recursively or iteratively sub-divide Bezier patches, effectively generating more points which are a closer approximation to the actual curve. Rendering may then be performed by using said points to define flat edged polygons, usually quadrilaterals or, preferably, triangles, whereafter individual pixels are allocated to the regions within the polygons by a process known as scan conversion.

However, the problem with known techniques for performing sub-division is that, after each iteration, it is necessary to determine whether sufficient divisions have been made. It is known that flatness tests may be performed after each sub-division has been executed, however, it is also known that the computational overhead for performing such a flatness test is relatively large, therefore, although the manipulations required to perform the sub-division itself do not place unrealistic constraints upon the processing capabilities available, the necessity to perform flatness testing as part of the sub-division process makes the use of Bezier patches unattractive. This is because the computational gain in not having to transform all of the polygons is substantially lost during the sub-division process for reconstituting polygons after a transformation has taken place.

It is an object of the present invention to provide an improved system for sub-dividing an area into a plurality of polygons.

SUMMARY OF THE INVENTION

According to an aspect of the present invention, there is provided a method of dividing an area into a plurality of polygons in a graphic system, by sub-division, wherein the number of divisions is predetermined by processing values indicative of curvature prior to initiating sub-division, so that said sub-division is carried out said predetermined number of times.

Thus, an advantage of the present invention is that a determination is made as to the number of sub-divisions required before entering interactive control, wherein the efficient use of processing power is critical.

It is unnecessary in accordance with the present invention, to perform flatness testing after each sub-division.

In a preferred embodiment, the area is defined by Bezier curves, wherein each Bezier curve is defined by a pair of end control points and a pair of curvature control points. Preferably, said value indicative of curvature is a value indicative of an angle between vectors connected to said curvature control points.

DETAILED DESCRIPTION OF THE PREFERRED EMBODIMENTS

Figure 1:
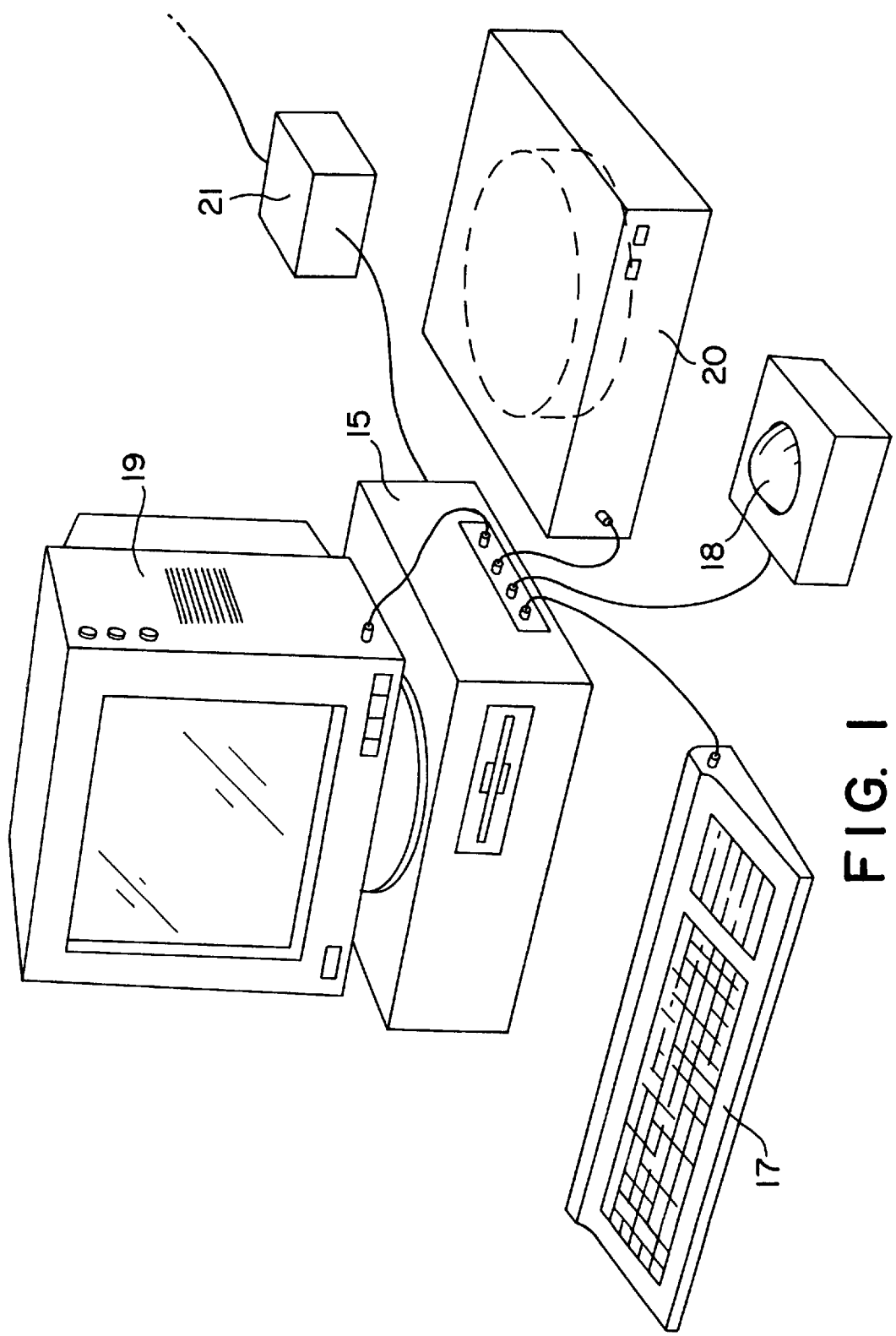
FIG. 1 shows an interactive three-dimensional graphics system, including a processor for manipulating three-dimensional data and generating two-dimensional data.

A system for processing image data representing three-dimensional objects is shown in FIG. 1. A processor 15 is arranged to write data to and read data from local memory. Data stored in the processors' memory defines three dimensional image data, two dimensional image data and instructions to the processor 15.

The processor 15 receives input data, from input devices consisting of a manually operable keyboard 17 and a position sensitive device, such as a mouse, a trackerball 18 or a digitising stylus etc.

Two-dimensional images are displayed on a visual display unit 19, which receives output image data at video rate by raster scanning a frame buffer, often provided with proprietry display units. The visual display unit has a definition of, typically, one thousand lines with one thousand pixels on each line, requiring a frame buffer with one million pixel locations. For the bulk transfer of program data and image data, a mass storage device 20 is provided, such as a hard magnetic disk, optical disk or tape drive etc.

In the present embodiment, data defining geometry is stored in the form of control points defining Bezier patches, which may be manipulated in three-dimensional space. Thereafter, once a viewing position has been selected for rendering in two-dimensions, each Bezier patch is broken down into a plurality of vertices defining polygons, whereafter pixel values are calculated by scanning the area of each polygon.

Figure 2:
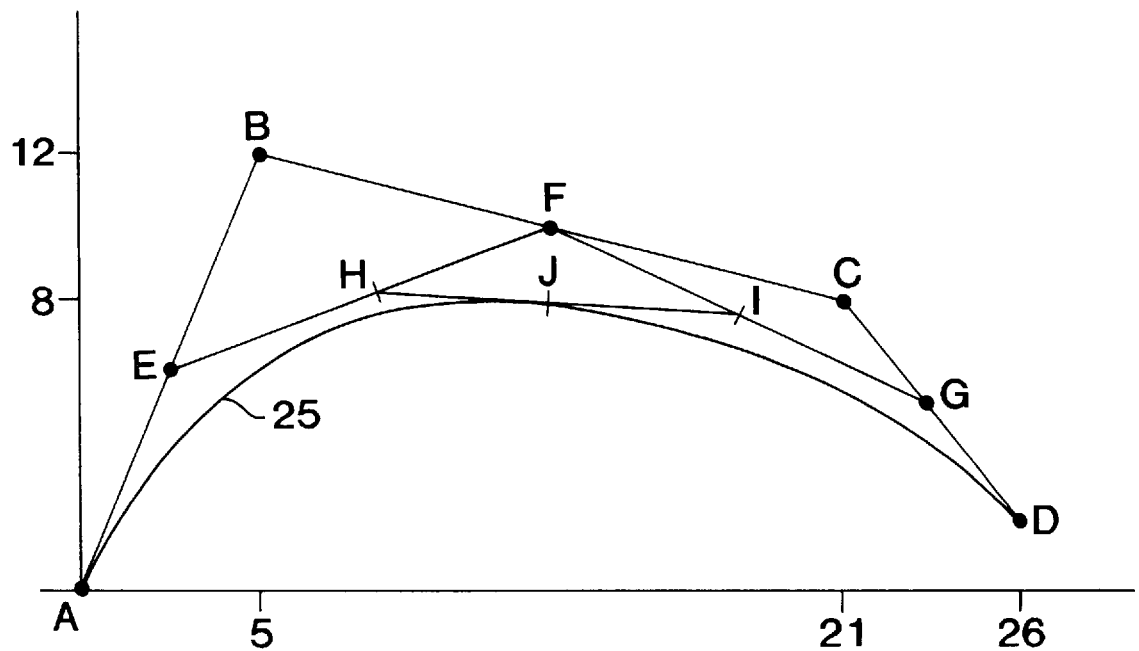
FIG. 2 shows a Bezier curve, the control points for defining said curve and the equations for calculating points on the curve from the position of said control points.

A parametric Bezier curve 25 is shown in FIG. 2, consisting of a locus of points moving from an end control point A to another end control point D, in response to the position of curvature control points B and C. The locus of points are calculated over the parameter space t=0 to t=1 and, for each value of t, a point may be calculated which receives contributions from the positions of points A, B, C and D. The blending contributions are determined from a bi-cubic function known as the Bernstein blending function, detailed below the Bezier curve in FIG. 2. Thus, points along the curve are calculated by substituting the x, y and z coordinate values of the control points A, B, C and D into the blending function for calculating new values for x, y and z, as t varies between zero and unity.

An attractive feature of Bezier curves, within an interactive graphics environment, is that the curve can be drawn to any requried resolution from input data consisting of the coordinates for points A, B, C and D. Thus, the whole curve can be manipulated in three-dimensional space by manipulating the positions of just the four control points which define it. Thereafter, rendering to create a displayable image can be performed at any desired resolution, by dividing the surface into flat polygons and then rendering each polygon.

As shown in FIG. 2, when points A, B, C and D are connected by vectors AB, BC and CD it can be seen that the actual curve is tangential to vector AB at point A and tangential to vector CD at the end control point D. It can also be seen that the position of points B and C controls the extent of the curvature and these points are therefore referred to herein as curvature control points.

In a system such as than shown in FIG. 1, data defining the shape of the Bezier curve 25 consists of three-dimensional coordinate locations for the control points A, B, C and D. In order to render such a curve it is necessary to approximate its shape by straight line segments defining renderable flat polygons. As previously stated, an approach would be to calculate points using the blending function detailed in FIG. 2, although problems with this approach include deciding how many points need to be calculated and executing the demanding calculations.

In the present embodiment, areas are divided into a plurality of polygons by recursive or iterative sub-division and this technique will be detailed with reference to the single Bezier curve shown in FIG. 2. A first approximation to the actual Bezier curve 25 would consist of vectors AB, BC and CD joining the control points A, B, C and D. As readily appreciated from the example shown in FIG. 2, such an approximation would rarely provide satisfactory results, given that the curvature control points may be a significant distance away from the locus of the actual curve.

Sub-division is performed by identifying an intermediate point E between points A and B. This point is easily calculated because the x coordinate of E is the average of the x coordinates for points A and B and similarly averaged values can be determined for the y and z coordinates. Thus, a similar intermediate point F is located halfway along the vector BC and a third intermediate point G is identified halfway along the vector CD. This process is continued by identifying an additional point H halfway along vector EF and point I halfway along vector FG, from which a new vector HI is defined. . Finally, point J is calculated as a point halfway along vector HI.

Points E, H, I and G do not lie on the Bezier curve 25 but point J is a point of the Bezier locus. Furthermore, the Bezier curve 25 connecting points A to D may now be considered as two Bezier curves, . a first connecting points A to J and a second connecting points J to D. Thus, the curve not only passes through point J but, at point J, it is also tangential to the vector HI. Thus, point J provides a new end control point for two Bezier curves while points E and H provide a first set of curvature control points and points I and G provide a second set of curvature control points.

From a rendering point of view, an initial approximation consisting of the three straight lines AB, BC and CD has being improved by the generation of six straight lines AE, EH, HJ, JI, IG and GD.

In some situations, this first iteration will not be sufficient. However, a better approximation to the curve 25 may be generated by considering the curve to be made up of two separate Bezier curves, a first defined by control points A, E, H and J and a second defined by control points J, I, G and D. Thus, the sub-division procedure, performed and illustrated in FIG. 2 for points A, B, C and D, may be repeated firstly for points A, E, H and J and secondly for points J, I, G and D. Thus, this sub-dividing could be repeated to the resolution limits of the system and the problem with the technique, as previously identified, is that of deciding how many sub-divisions are to be performed.

After each division it is possible to perform a flatness test, as described in "Computer Graphics Principles and Practice", second edition, pp 513–514 by Foley, van Dam, Feiner and Hughes. However, if flatness tests are performed each time, the overall computational overhead becomes excessive and the computational reduction gained by using Bezier curves is substantially lost, due to the repeated flatness testing.

Figure 3:
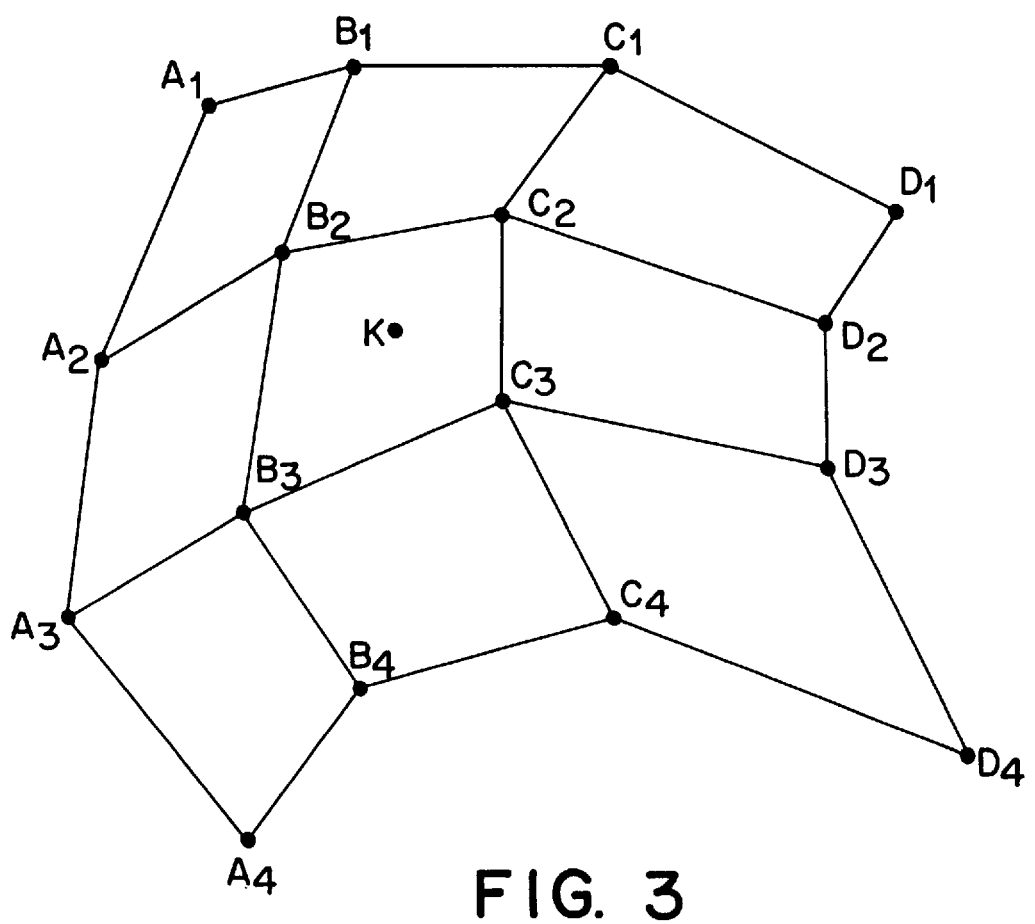
FIG. 3 shows a Bezier patch, defined by Bezier curves.

A Bezier curve, consisting of a locus of points is defined in two dimensions. However, a group of Bezier curves combined to define a plane, referred to as a Bezier patch, includes control points which may be positioned anywhere in three-dimensional space. The control points for a Bezier patch of this type are shown in FIG. 3, in which points A1, B1, C1 and D1 define a Bezier curve, points A2, B2, C2 and D2 define a second curve, points A3, B3, C3, D3 define a third curve and points A4, B4, C4 and D4 define a fourth curve. In addition, a second set of curves is defined by points A1, A2, A3, A4, points B1, B2, B3 and B4, points C1, C2, C3, C4 and points D1, D2, D3 and D4. Thus, the patch is defined by a total of eight Bezier curves in three-dimensional space, configured from a total of sixteen control points, in which each of said points provides a control point for two of said curves. Some control points (A1, D1, A4 and D4) are end control points for two curves, while some (B2, C2, B3, C4) are curvature control points for two curves, while the reminder are end control points for one curve but curvature control points for the other.

As can be seen from FIG. 3, vectors connecting the control points divide the patch into a total of nine segments. However, it should also be understood that the lines shown connecting points in FIG. 3 do not actually lie on the curve itself but are equivalent to vectors AB, BC and CD of FIG. 2

Thus, the nine polygons shown in FIG. 3, formed by connecting the control points of the Bezier patch, could be used to provide a first approximation to the actual patch, for rendering purposes, in the same way in which vectors AB, BC and CD form a first approximation to the Bezier curve 25 in FIG. 2.

This division consists of connecting all adjacent control points and illustrates the accepted way of dividing the patch into renderable polygons. Furthermore, more accurate polygonization can be provided by sub-dividing each Bezier curve of FIG. 3, wherein each curve is divided into a pair of curves, having a common end control point, similar to point J in FIG. 2. Thus, by sub-dividing each curve, each quadrilateral polygon is divided into four smaller quadrilateral polygons, resulting in a total of 36 polygons for the whole patch.

As stated with reference to FIG. 2, the newly calculated point J is a point which does actually lie on the Bezier curve. Similarly, when considering a surface, newly calculated point K at the centre of the surface is a point which actually does lie on the surface. Thus, the patch may be considered as being made up of four smaller patches and the sub-dividing process may be repeated for each of these four patches.

As previously stated, a known problem with dividing patches in this way is in performing tests to determine whether, after each division, a further division is required. In the present embodiment pre-processing is performed on each Bezier patch to determine how many iterations are required for that patch, so that, after transformation into two-dimensional viewing space, sub-division is performed n times for each patch, where the value n for that particular patch was precalculated.

Figure 4:
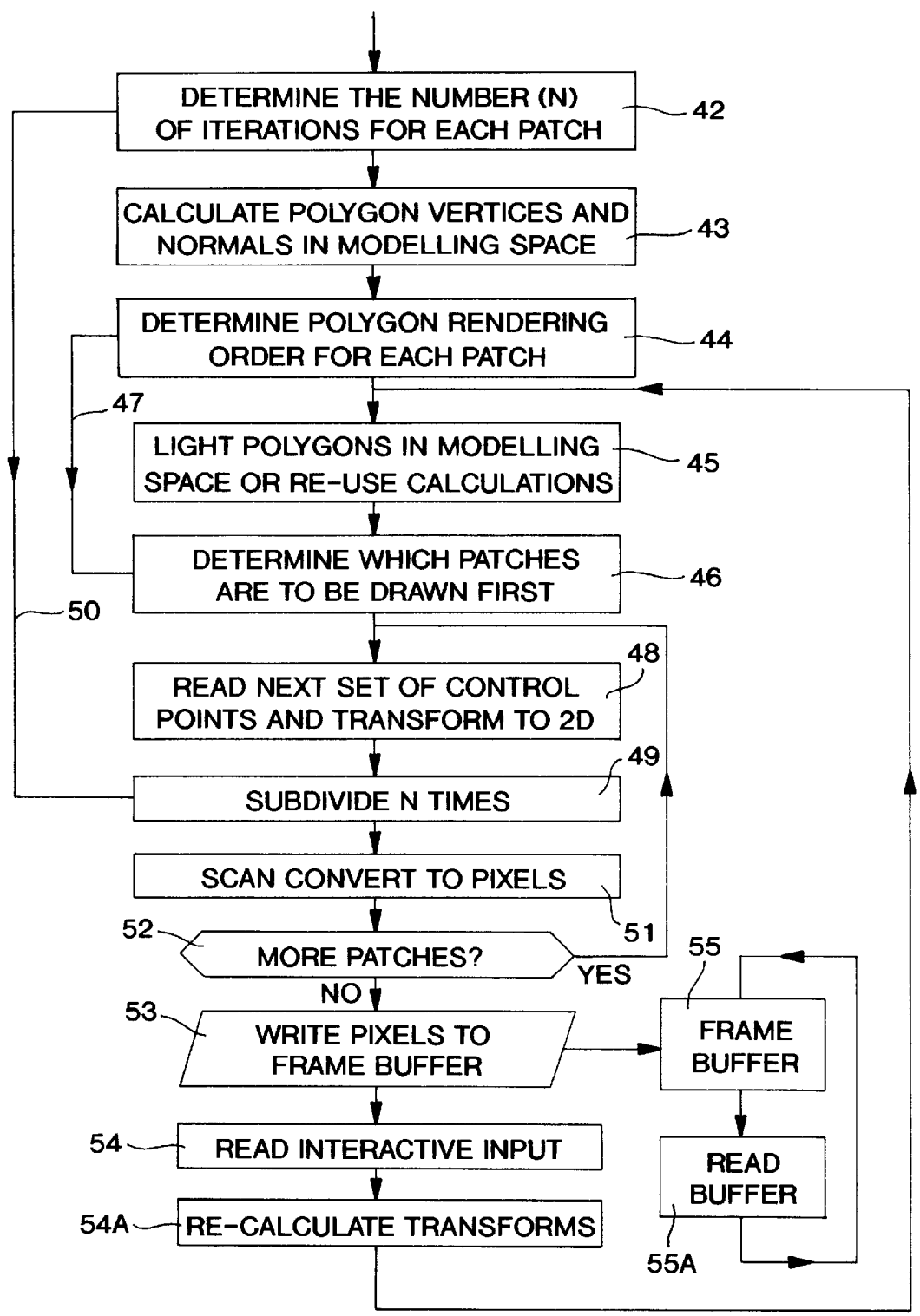
FIG. 4 illustrates the operation of an interactive three-dimensional graphics system, embodying the present invention.

The operational stages performed by the apparatus shown in FIG. 1 and embodying the present invention are shown in FIG. 4.

Geometry data, defining the shape of objects, is stored in the form of control points for Bezier patches of the type shown in FIG. 3. Each patch includes a total of sixteen vertices, A1 to D4 from which the overall shape of the patch for any orientation in three-dimensional space and from any viewing position, can be determined.

In FIG. 4, steps 42 to 44 are pre-processes performed prior to the initiation of interactive operation. The pre-processes calculate data, relevant to the objects under consideration, so as to reduce computational demands during interactive operation: it being noted that many of the processing requirements forming part of the interactive loop are required to be performed during each iteration, therefore substantial savings can be made by reducing the amount of processing required within the interactive loop.

At step 42, a determination is made as to the number of iterations required to produce a sufficient number of polygons for each Bezier patch. Thus, although polygons are produced using the previously described sub-division technique, it is not necessary, during this process, to determine whether sufficient divisions have been made. The level of divisions required is pre-calculated and whenever polygons are required to be produced from Bezier patches, this data is recalled and sub-division is performed n times, where n is generated during the pre-processing period.

At step 43, the polygons are generated in modelling space, also referred to as object space, so that, in modelling space, the object is defined by its Bezier control points and also by polygons, produced by n sub-divisions. Furthermore a unit normal vector is calculated for each polygon, allowing lighting calculations to be performed in modelling space.

At step 44, calculations are made to determine the order in which patches should be rendered. An example of a technique for assessing the order in which the polygons should be rendered is detailed in our copending U.S. patent application Ser. No. 07/937,701 (corresponding to EP-A-0531157) technique detailed in this Patent Application is employed upon the polygons produced at step 43. This information is then used to determine the order in which whole patches should be rendered, wherein the first occurrence of a polygon from a particular patch in the priority order, establishes the priority for the whole patch.

After the termination of step 44, the system is ready to enter interactive operation, in which objects, light sources and the position of the viewer appear to move within a synthesized three-dimensional space, in response to input commands.

On initiating interactive operation, objects (defined by Bezier patches), light sources and a viewing position are defined and the objects are projected onto a two-dimensional viewing plane. Each iteration of the interactive loop consists of receiving input data defining translations within three-dimensional space, projecting three-dimensional data onto a two-dimensional viewing plane and rendering the two-dimensional data into an array of pixels. Given that objects are constructed from a plurality of patches, the order in which said patches are rendered depends upon the orientation of the object and the viewing position. At step 44, lists are constructed specifying patch rendering orders for particular view orientations. At step 46 the view orientation of the object is determined and this information, in addition to data determined at step 44, is used to calculate the order in which the patches themselves are rendered. Thus, flow line 47 represents the transfer of information from step 44 to step 46.

At step 48, control points for the first patch to be rendered, as determined at step 46, are transformed, under the operation of a transformation matrix, to two-dimensional viewing space.

At step 49, the control points transformed into two-dimensional viewing space are sub-divided n times, where the value n was previously calculated at step 42 and the transfer of information from step 42 to step 49 is illustrated by flow arrow 50.

When the whole patch has been scan converted at step 51, a question is asked at step 52 as to whether further patches are present in the scene. If this question is answered in the affirmative, control is returned to step 48, which reads the next set of control points for transformation into two-dimensional space. Thus, this reading of control points, with subsequent sub-division and scan conversion is repeated until all of the patches have been reduced to pixels. This results in the question asked at step 52 being answered in the negative and, at step 53, calculated pixel values are written to a frame buffer 54.

In addition to being written to the frame buffer at interactive rate, the frame buffer 54 is also read repeatedly, at step 55, at video rate, thereby generating a video output signal for the monitor 19.

At step 54, interactive input commands are read and at step 55 new transforms are calculated in response to the interactive inputs received at step 54. Thus, in response to the interactive input supplied at step 54, modified transformations are effected at step 48.

After recalculating the transformations, control is returned to step 45, thereby completing the interactive loop. If, in response to interactive inputs received at step 54, the position of an object has not changed with respect to the position of any light source, lighting calculations are reused at step 45.

Curvature is determined by considering each Bezier curve making up the patch and a notional value representing the curvature of the patch is adopted based upon the most curved Bezier curve of the patch.

Figure 5:
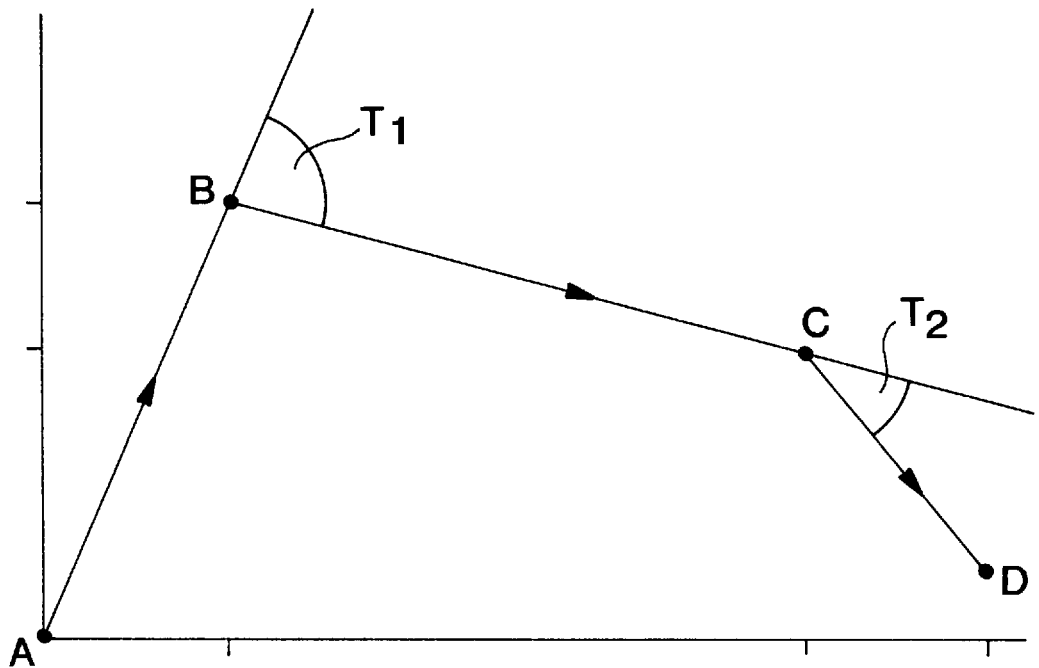
FIGS. 5 and 6 illustrate a preferred procedure for calculating the curvature of a Bezier patch and for determining the number of iterations required to divide the patch into polygons.

A Bezier curve similar to the curve shown in FIG. 2, is shown in FIG. 5. Pre-processing performed at step 42 involves considering the positions of points A, B, C and D, that is to say, the control points defining the Bezier-curve rather than the locus of the Bezier curve itself. The points A, B, C and D are considered as connected by vectors AB, BC and CD. Vector AB has a direction defined by that taken to move from A to B. Similarly, vector BC has a direction, being that required to move from B to C, while the direction of vector CD is that required to move from point C to point D. When considered as a combined movement from point A to D via point B and point C, a turn is encountered at point B and a similar turn is encountered at point C. These turns may be defined by turning angles t1 and t2 respectively. Furthermore, the extent of these turning angles t1 and t2 are related to the curvature of the Bezier curve itself, therefore an analysis of turning angles t1 and t2 provides a basis for calculating the curvature of the patch, which is then used to determined the number of sub-divisions required to divide the patch into a suitable number of polygons.

Each patch is considered in turn and each set of control points (a total of eight sets) defining the Bezier curves for the patch are considered in turn. Thus, referring to the control points shown in FIG. 5, vectors AB, BC and CD are converted to define vectors having equivalent directions but of unit length. Thus, the converted vector derived from vector AB will be identified herein as AB with similar representations BC and CD being used to represent the unit vectors derived from vectors BC and CD respectively.

A value representing the curvature of the Bezier curve is calculated by forming the sum of the dot product between unit vectors AB and BC and the dot product between unit vectors BC and CD. Being of unit length, the result of calculating the dot product of AB and BC will be equal to the cosine of angle t1. Similarly, the dot product of BC with CD will be equal to the cosine of angle t2.

In theory, angles t1 and t2 may have any value from zero to a full 360 degrees. A numerical value is calculated representing curvature by considering the cosine of the turning angle determined, as previously stated, by calculating the dot product of unit vectors. A major advantage of using the cosine function is that a positive turn angle in excess or 180 degrees yields the same result as its negative equivalent. Thus, the cosine function only measures the amount of turn and is not influenced by the direction of the turn.

The Bezier curve is least curved when angle t1 is small (or reflex) therefore the curve is less curved when the cosine of t1 is positive. Similarly, the curve becomes more curved as the cosine value becomes negative, with the extreme condition being at 180 degrees, where the cosine is −1.

The overall curvature of the curve is determined by adding together the cosine of angle t1 with the cosine of angle t2, thereby giving curvature values which range from +2 (least curved) to −2 (most curved).

The curvature of the whole patch is determined by the most curved curve defining the patch. Thus, the patch as a whole will be accorded a notional curvature value equal to the lowest (most negative) value calculated for the Bezier curves making up the patch. This measure of notional curvature provides a basis for determining the number of sub-divisions required to divide the patch into renderable polygons. The number of sub-divisions performed may vary from machine to machine and specific values for one type of machine for a particular environment may be calculated emperically. In the present embodiment the maximum number of sub-divisions which may be performed is five.

Figure 6:
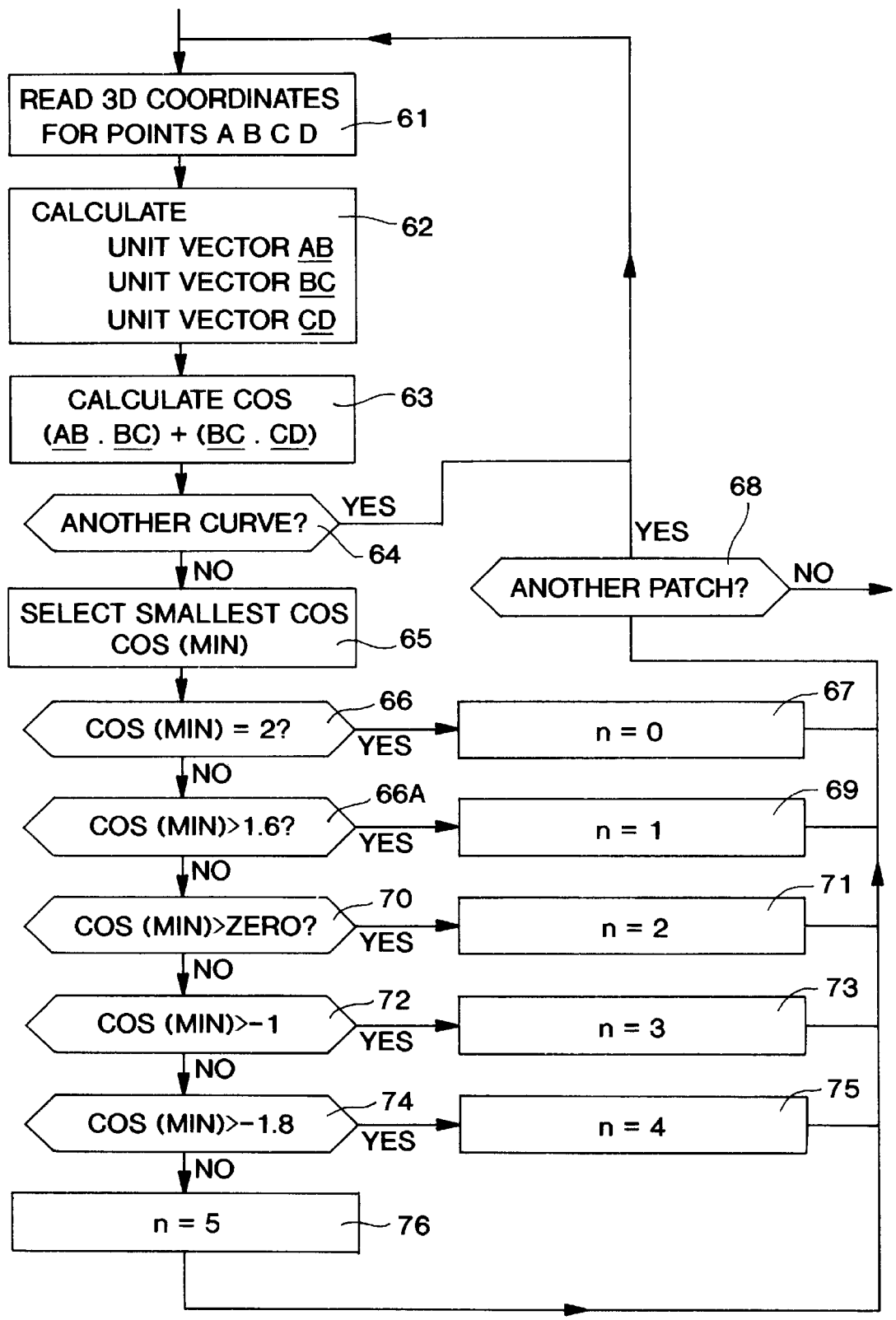

The operations performed at step 42 in FIG. 4 are detailed in FIG. 6. A first patch is selected and a first Bezier curve of said patch is considered at step 61, which reads the three-dimensional coordinates for the four control points defining the Bezier curve, A, B, C, D. At step 62 unit vectors AB , BC and CD are calculated by considering vectors AB, BC and CD. As previously stated, each unit vector has a direction equivalent to the vector from which it is derived but is of unit length.

At step 63 the combined cosine value COS is calculated as the sum of the dot products between AB with BC and BC with CD .

At step 64, a question is asked as to whether there is another curve (of the eight curves defining the patch) to be considered within the patch and if this question is answered in the affirmative, control is returned to step 61 and the coordinate values A, B, C, D for the next curve are considered.

If the question asked at step 64 is answered in the negative, the smallest COS value calculated for the patch is selected, identified herein as COS (MIN). The curve having the smallest COS value, the smallest possible value being −2, has the greatest curvature and this curve is therefore selected as being the one defining the nominal curvature of the patch as a whole.

At step 66, a question is asked as to whether the value for COS selected at step 65 is equal to 2, representing a perfectly non-curved surface. If this question is answered in the affirmative, n is set equal to zero at step 67 and a question is asked at step 68 as to whether any more patches are to be considered. The value n represents the number of sub-divisions to be performed and for a perfectly flat surface, no divisions are required.

If the question asked at step 66 is answered in the negative, that is to say, COS (MIN) has a value less than 2, a question is asked at step 68 as to whether COS (MIN) is greater than 1.6. If this question is answered in the affirmative, n is set equal to 1 at step 69 and control returns to the question at step 68.

If the question asked at step 68 is answered in the negative, a question is asked at step 70 as to whether COS (MIN) is greater than zero. If this question is answered in the affirmative, n is set equal to 2 at step 71 and control returns to the question asked at step 68.

If the question asked at step 70 is answered in the negative, a further question is asked at step 72 as to whether COS (MIN) is greater than −1. If this question is answered in the affirmative, n is set equal to 3 and control returns to the question raised at step 68.

Finally, if the question asked at step 72 is answered in the negative, a question is asked at step 74 as to whether COS (MIN) is greater than −1.8. If this question is answered in the affirmative, n is set equal to 4 at step 74 and control is returned to the question at step 68. If the question raised at step 74 is answered in the negative, n is set equal to 5 at step 76 and control is returned to the question raised at step 68.

In this example, n, the number of sub-divisions performed within a particular patch, may have any value ranging between zero and five. However, the maximum number of sub-divisions carried out by the system may be selected so as to suit any particular application. Similary, the judgements made as to the relationship between COS (MIN) and the number of iterations required may be arbitrarily chosen for any particular application.

If the question asked at step 68 is answered in the affirmative, control is returned to step 61, the first set of coordinates for the next Bezier patch are read and the process repeated. Eventually, the question asked at step 68 will be answered in the negative, thereby allowing the pre-processing procedure to continue to step 43.

Figure 7:
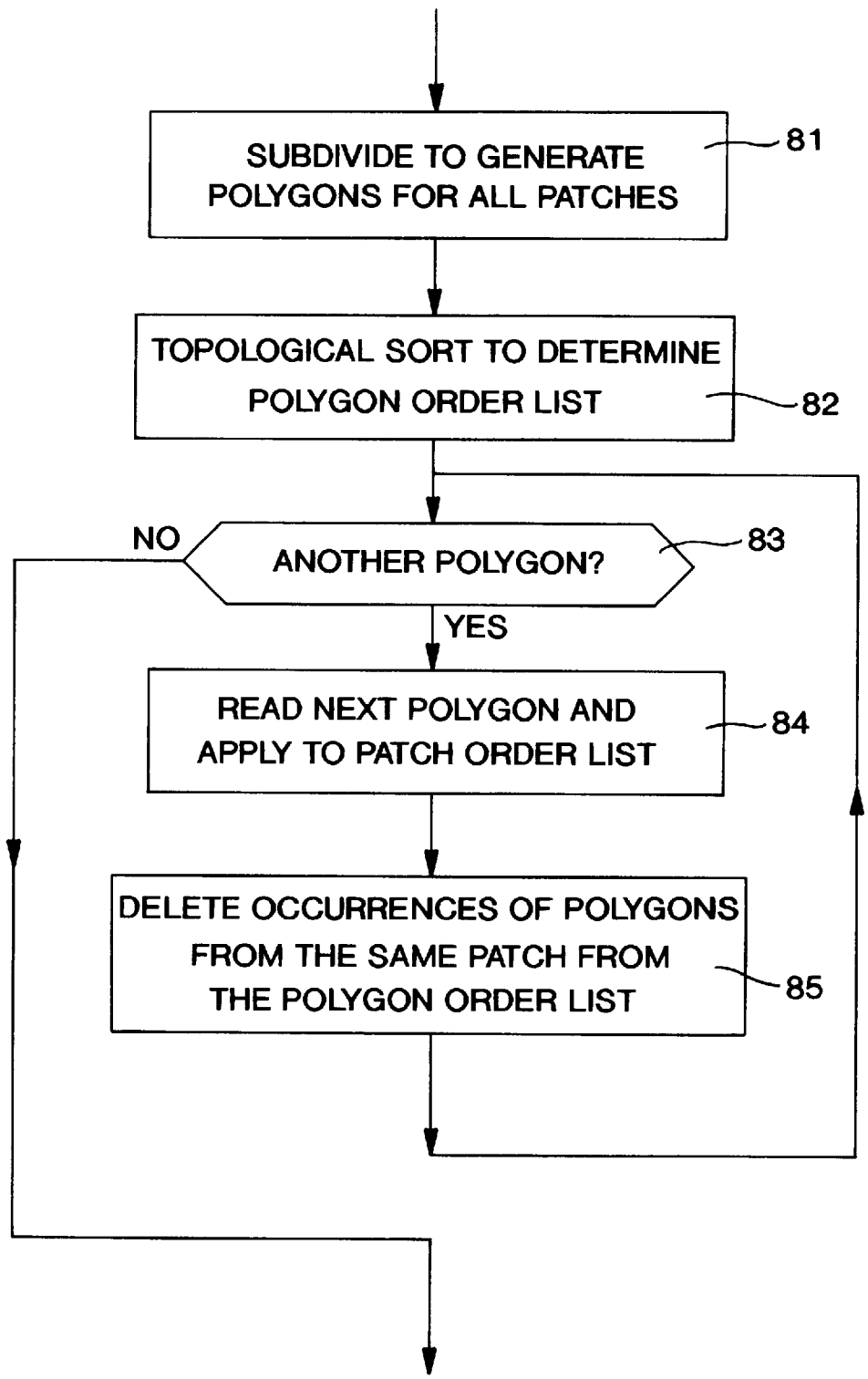
FIG. 7 illustrates the procedure for determining the order in which patches are to be rendered.

As shown in FIG. 4, step 46 determines the patch rendering order, with reference to polygons derived from the patch (step 44). The process performed at steps 44 and 46 is detailed in FIG. 7 in which, at step 81, patch data is sub-divided n times to produce polygons in modelling space. All of the patches are processed in this way to produce an arbitrary list of polygons. At step 82 a topological sort is performed on the polygons, as described in our copending U.S. pat. application Ser. No. 07/937,701 the full contents of which are included herein as part of the present disclosure. Thus, at step 82 a polygon order list is produced, which lists the polygons in the order in which they should be rendered, for a particular set of viewing parameters. A plurality of lists are produced and a particular list is selected during interactive operation. Thus, referring to FIG. 4, the lists are produced at step 44 and the particular list required is selected at step 46, as part of the interactive process.

At step 83 a question is asked as to whether another polygon exists in the polygon order list and, when answered in the negative, process 44 (FIG. 4) terminates, allowing control to enter the interactive loop.

When the question raised at step 83 is answered in the affirmative, the next polygon from the polgyon order list is read at step 84 and applied to the patch order list. Thus, in addition to including data identifying the particular polygon, the polygon order list also includes an identification of the polygon's originating patch. Thus, it is this information which is relevant to the patch order list, produced at step 84.

At step 85 all occurences of polgons belonging to the same patch as that identified at step 84 are deleted from the polygon lists produced at step 82. Thus, the procedure is only interested in identifying a set of polygons derived from a particular patch once, so that the patch may be added to the patch order list at step 84.

Thereafter, control is returned to the question at step 83 and if polygons still exist in the polygon order list, step 84 is repeated. On this occurrence, all entries relating to previously identified patches will have been deleted from the polygon order list, such that the next polygon read at step 84 must relate to another patch. Thus, another patch will always be added to the patch order list and again all other occurences of polygons from the same patch are deleted from the polygon order list.

When an object includes a concavity, viewing angles exist from which a forward facing polygon will lie in front of another forward facing polygon. In this situatation, the outer most polygon of the two will, from some angles, occlude the innermost polygon. In practice, the total number of such occlusions is quite low.

At step 82, a sorter operates to sort polygons in two stages. In a first stage, polygons which may potentially occlude others are separated from those which will not. Of the polygons where the potential for occlusion exists, every polygon is compared with that polygon to determine whether the other polygons lie behind or in front of the plane of that polygon. A polygon is considered to lie in front of the plane if all of its vertices lie in front of the plane and, to avoid indeterminacy, a polygon is also considered to lie in front of the plane if some vertices are in front and other are in the plane (within prescribed tolerances) or if all are in the plane.

The sorter takes in turn each polygon in the list and derives the coefficients of the equation defining the plane, that is $Ax+By+Cz+D=0$, from the coordinates of vertices defining the plane. The sorter then examines each other polygon in turn and determines, for that polygon, whether all the modes of that polygon satisfy the inequality, to the effect that $Ax+By+Cz+D$ is greater than zero. If the inequality is met for all vertices of the first compared polygon, that polygon is considered to lie wholly in front of the polygon under consideration and the sorter proceed to the next other polygon. If all nodes are coplaner or if the second polygon lies wholly behind the plane of the first, when viewed normal to that plane, that polygon is considered to lie wholly behind the polygon under consideration. The sorter creates a new table containing an entry for each polygon in the table, each entry comprising a set or list of the numbers of the other polygons which lie behind that polygon. Each time every node of a polygon lies behind the plane of another, an indication of the identity of that polygon is recorded in a "behind" list.

Further details of the procedure for producing the topological sort step 82 are disclosed in the aforesaid copending application which, as previously stated, forms part of the present disclosure.

Referring to FIG. 4, after the patch has been sub-divided n times, scan conversion takes place at step 51 in order to generate pixels. Pixel values are generated on a polygon. by. polygon basis. Therefore each Bezier patch is divided into a plurality of flat edged polygons.

Figure 8A:
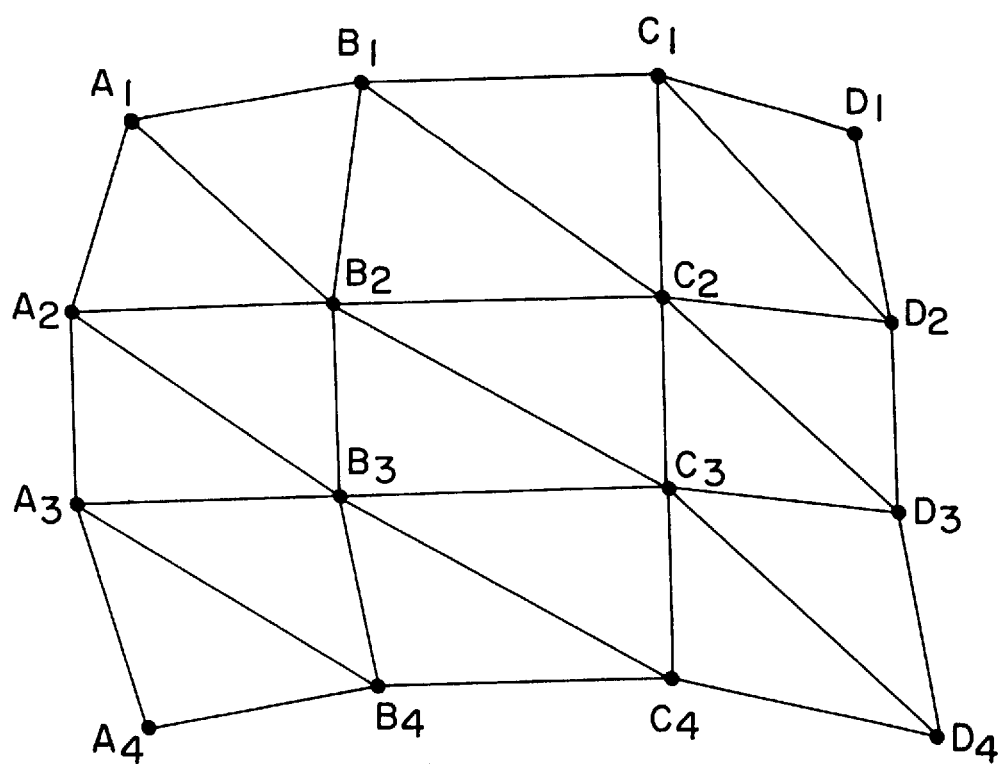
FIG. 8A shows conventional polygonisation of a Bezier patch.
Figure 8B:
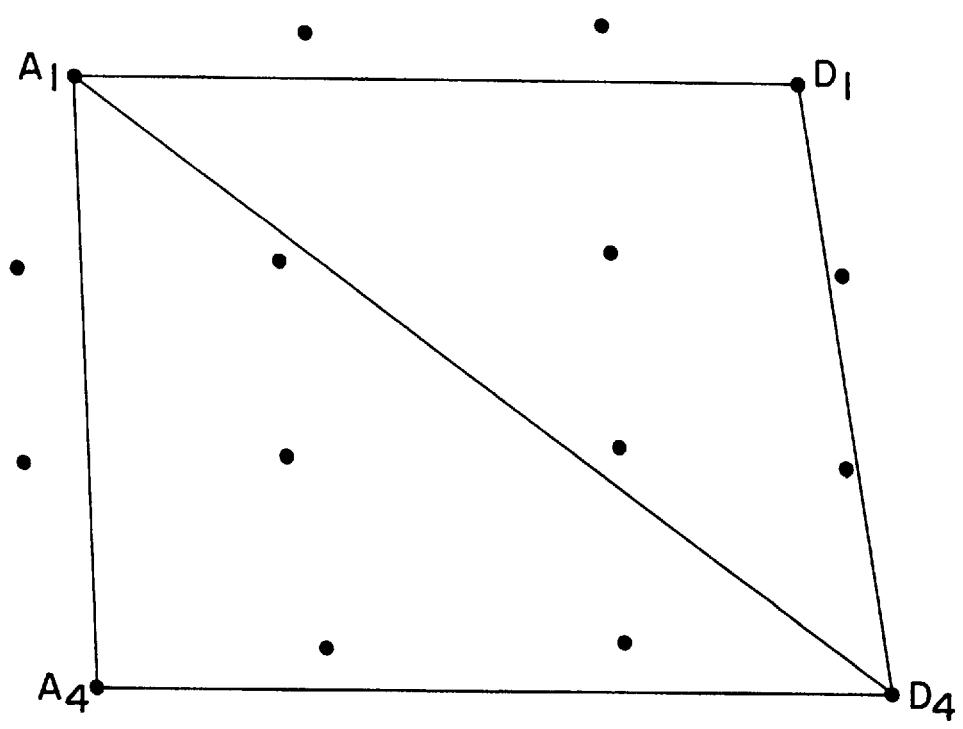
FIG. 8B shows a Bezier patch polygonisation produced by an embodiment of the present invention.

FIG. 8A and FIG. 8B both show an array of 16 Bezier control points defining a Bezier patch produced after the n sub-divisions have been carried out. Thus, after one division, the patch shown in FIG. 8A will have been divided into an array of a total of four similar patches. Again, after two divisions a patch shown in FIG. 8A will have been divided into of a total of 16 patches and so on.

Each Bezier patch produced by sub-division may be divided into polygons in a substantially similar manner. Thus, in accordance with the conventional approach to rendering Bezier patches, each control point of the patch is notionally connected to its nearest neighbours to produce nine quadrilaterals. Thereafter, each of said quadrilaterals is divided across a diagonal to yield two triangles, therefore each Bezier patch is divided into a total of eighteen renderable polygons.

An alternative for dividing the patch shown in FIG. 8A is detailed in FIG. 8B. In FIG. 8B the Bezier patch, having control points at equivalent positions to the patch shown in FIG. 8A, is divided into renderable polygons by connecting the four corner control points A1, D1, D4 and A4 to produce a quadrilateral. These selected control points may be considered as a set which are all end control points for two Bezier curves defining the patch. This quadrilateral is then divided into two renderable triangles by connecting point A1 to D4.

Referring back to FIG. 2, the rendering procedure performed in FIG. 8A for a patch is equivalent to estimating the Bezier curve 25 by a line ABCD. As can be seen from FIG. 2, this produces an estimate which lies outside curve 25, that is to say it is larger than curve 25. The rendering solution shown in FIG. 8B is effectively equivalent to connecting points A and D directly. Again this only estimates the shape of curve 25 but on this occasion the estimate is within the curve 25, that is to say, it produces an estimate which is smaller than the curve 25.

As further sub-division are effected, both estimates to the patch come closer to the actual patch. However, irrespective of the number of divisions made, the conventional estimate, of the type shown in FIG. 8A, will lie outside the patch, whereas the alternative estimate, as shown in FIG. 8B, will lie inside the patch. Thus, again referring to FIG. 2, an estimate produced on the second sub-division would connect point A to point J directly and connect point J to point D directly which, as will be appreciated, provides a significantly better estimate to the position of curve 25.

In the embodiment, an operator is given a choice as to whether polygonisation is to be performed in accordance with the conventional technique as detailed in FIG. 8A or in accordance with the present invention as detailed in FIG. 8B. Thus, the operator is given two rendering possibilities, one which produces polygons which lie outside the actual Bezier curve itself and another which will produce polygons lying within the Bezier curve itself. It will be appreciated that the preferred solution to producing polygons will often be dependent upon the overall application being executed by the operator.

In the known approach to dividing the Bezier patch by connecting control points, as shown in FIG. 8A, all of the control points are connected. However, the essential difference to the alternative approach is that only a selected set of control points are connected. Thus, in addition to connecting points A1, D1, A4 and D4, points B2, C2, B3 and C3 could also be connected. Thus, the set of connected points may be defined as those points which provide end control points for two Bezier curves along with control points which provide curvature control points for two Bezier curves, while excluding the control points which provide an end control point for one Bezier curve and a curvature control point for another Bezier curve. Furthermore, it will be appreciated that other sets may be selected from the available control points, for connecting so as to form the basis of defining renderable polygons.

What we claim is:

1. In a graphics apparatus having a processor for processing signals defining objects in a three dimensional space, each object comprising a plurality of Bezier patches, a method of processing the signals to divide a given Bezier patch having a curvature into a plurality of polygons by recursive sub-division, the given Bezier Patch being defined Bezier curves, each of said Bezier curves having a pair of end control points and a pair of curvature control points, said method comprising the steps of:

generating processing values indicative of the curvature of the given Bezier patch by (i) for each Bezier curve in the given patch, sequentially connecting the end control points and the curvature control points to define pairs of notional vectors, each pair of notional vectors having an ante therebetween; and (ii) calculating said processing values in dependence upon said angles;

calculating a division number for the given Bezier patch using said processing values; and recursively sub-dividing the given Bezier patch a number of times corresponding to the division number.

2. A method according to claim 1, wherein each Bezier curve has a curvature, wherein, for each Bezier curve, said pairs of notional vectors comprise a notional connecting sequence of vectors, wherein each said angle is a turning angle from one of said notional vectors to a next one of said notional vectors in said sequence, and wherein the step of calculating said processing values includes the step of combining the turning angles within each sequence of vectors to determine the curvature of each Bezier curve.

3. A method according to claim 1, wherein, in said calculating step, the angle between each pair of vectors is represented by its cosine.

4. A method according to claim 3, wherein said cosine is calculated by calculating the dot product of the pair of vectors.

5. A method according to claim 1, wherein said Bezier curves have different curvatures and the step of generating said processing values comprises determining which curve has the highest curvature, this highest curvature then being taken as the curvature of the given Bezier patch.

6. A method according to claim 1, wherein said graphic system is an interactive three-dimensional system arranged for modelling movement of said objects in said three-dimensional space in response to input commands, said apparatus further comprising means for processing said signals so as to project said objects into a viewing space defined by a viewing position in said three dimensional space, and wherein the step of recursively sub-dividing said given Bezier patch is performed after projection into said viewing space.

7. A graphics apparatus for processing signals defining objects in a three-dimensional space, each object being comprised of a plurality of Bezier patches, to divide a given Bezier patch having a curvature into a plurality of polygons by recursive sub-division, the given Bezier patch being defined by Bezier curves, each of said Hezier curves bavina a pair of curvature control points, said apparatus comprising:

means for generating processing values indicative of the curvature of the given Rezier patch comprising (i)

means for sequentially connecting, for each Bezier curve in the given patch, the end control points and the curvature control points to define pairs of notional vectors, each pair of notional vectors having an angle therebetween; and (ii) means for calculating said processing values in dependence upon said angles;

means for calculating a division number for the given Bezier patch using said processing values; and means for recursively sub-dividing the given Bezier patch a number of times corresponding to the division number.

8. An apparatus according to claim 7, wherein each Bezier curve has a curvature, wherein, for each Bezier curves said pairs of notional vectors comprise a notional connected sequence of vectors, wherein each said angle is a turning angle from one of said notional vectors to a next one of said notional vectors in said sequence, and wherein the means for calculating said processing values includes means for combining the turning angles within each sequence of vectors to determine the curvature of each Bezier curve.

9. An apparatus according to claim 7, wherein, in said calculating means, the angle between each pair of vectors is represented by its cosine.

10. An apparatus according to claim 9, wherein said cosine is calculated by calculating the dot product of the pair of vectors.

11. An apparatus according to claim 7, wherein said Bezier curves have different curvatures and the means for generating said processing values determines which curve has the highest curvature, this highest curvature then being taken as the curvature of the given Bezier patch.

12. An apparatus according to claim 7, wherein said apparatus is an interactive three-dimensional system arranged for modelling movement of said objects in said three-dimensional space in response to input commands, said apparatus further comprising means for processing said signals so as to project said objects into a viewing space defined by a viewing position in said three dimensional space, and wherein the means for recursively sub-dividing said given Bezier patch performs the sub-division after projection into said viewing space.

13. A method according to claim 6, wherein the division number calculated for the given Bezier patch is independent of said viewing position.

14. An apparatus according to claim 12, wherein the division number calculated for the given Bezier patch is independent of said viewing position.

15. A method according to claim 1, further comprising the step of rendering the polygons to produce rendered image data.

16. A method according to claim 15, further comprising the step of generating a signal conveying the rendered image data.

17. A method according to claim 16, further comprising the step of recording the signal.

18. A method according to claim 15, further comprising the step of processing the rendered image data in order to generate a display of an image of the objects.

19. An apparatus according to claim 7, further comprising means for rendering the polygons to produce rendered image data.

20. An apparatus according to claim 19, further comprising display means for processing the rendered image data to display a two-dimensional image of the objects.

21. An apparatus according to claim 19, further comprising a frame buffer for storing the rendered image data.

22. A data-storage medium storing instructions executable on a programmable processing apparatus such that, when the instructions are loaded into the apparatus, the apparatus is programmed to perform a method of processing signals defining objects in a three dimensional space, each object comprising a plurality of Bezier patches, said method processing the signals to divide a given Bezier patch having a curvature into a plurality of polygons by recursive sub-division, the given Bezier patch being defined by Bezier curves, each of said Bezier curves having a pair of end control points and a pair of curvature control points, the method comprising the steps of:

generating processing values indicative of the curvature of the given Bezier patch by (i) for each Bezier curve in the given patch, sequentially connecting the end control points and the curvature control points to define pairs of notional vectors, each pair of notional vectors having an angle therebetween; and (ii) calculating said processing values in dependence upon said angles;

calculating a division number for the given Bezier patch using said processing values; and recursively sub-dividing the given Bezier patch a number of times corresponding to the division number.

23. A data-storage medium according to claim 22, wherein each Bezier curve has a curvature, wherein, for each Bezier curve, said pairs of notional vectors comprise a notional connecting sequence of vectors, wherein each said angle is a turning angle from one of said notional vectors to a next one of said notional vectors in said sequence, and wherein the step of calculating said processing values includes the step of combining the turning angles within each sequence of vectors to determine the curvature of each Bezier curve.

24. A data-storage medium according to claim 22, wherein, in said calculating step, the angle between each pair of vectors is represented by its cosine.

25. A data-storage medium according to claim 24, wherein said cosine is calculated by calculating the dot product of the pair of vectors.

26. A data-storage medium according to claim 22, wherein said Bezier curves have different curvatures and the step of generating said processing values comprises determining which curve has the highest curvature, this highest curvature then being taken as the curvature of the given Bezier patch.

27. A data-storage medium according to claim 22, wherein said graphic system is an interactive three-dimensional system arranged for modelling movement of said objects in three-dimensional space in response to input commands, said apparatus further comprising means for processing said signals so as to project said objects into a viewing space defined by a viewing position in said three dimensional space, and wherein the step of recursively sub-dividing said given Bezier patch is performed after projection into said viewing space.

28. A data-storage medium according to claim 27, wherein the division number calculated for the given Bezier patch is independent of said viewing position.

29. A data-storage medium according to claim 22, wherein said method further comprises the step of rendering the polygons to produce rendered image data.

30. A data-storage medium according to claim 29, wherein said method further comprises the step of generating a signal conveying the rendered image data.

31. A data-storage medium according to claim 30, wherein said method further comprise s she step of recording the signal.

32. A data-storage medium according to claim 29, wherein said method further comprises the step of processing the rendered image data in order to generate a display of an image of the objects.

* * * * *

UNITED STATES PATENT AND TRADEMARK OFFICE
CERTIFICATE OF CORRECTION

PATENT NO. : 5,771,341             Page 1 of 3
DATED : June 23, 1998
INVENTOR(S) : RICHARD STIRLING HUDDY It is certified that error appears in the above-identified patent and that said Letters Patent is hereby corrected as shown below:

COLUMN 2

Line 29, "large, therefore," should read --large. Therefore,--.

COLUMN 3

Line 25, "processors'" should read --processor's--;
Line 34, "propri-" should read --proprietary--; and
Line 35, "etry" should be deleted.

COLUMN 4

Line 13, "than" should read --the one--;
Line 43, "defined. ." should read --defined.--; and
Line 48, ". a" should read --a--.

COLUMN 6

Line 45, "0531157)" should read --0531157). The--.

COLUMN 7

Line 33, "55" should read --54A--; and
Line 51, "Bezier-curve" should read --Bezier curve--.

UNITED STATES PATENT AND TRADEMARK OFFICE
CERTIFICATE OF CORRECTION

PATENT NO. : 5,771,341                          Page 2 of 3
DATED      : June 23, 1998
INVENTOR(S): RICHARD STIRLING HUDDY It is certified that error appears in the above-identified patent and that said Letters Patent is hereby corrected as shown below:

COLUMN 8

Line 6, "AB" should read --$\underline{AB}$--;
    Line 7, "BC and CD" should read --$\underline{BC}$ and $\underline{CD}$--;
    Line 11, "AB and BC" should read --$\underline{AB}$ and $\underline{BC}$--;
    Line 12, "BC and CD." should read --$\underline{BC}$ and $\underline{CD}$.--;
    Line 13, "AB and BC" should read --$\underline{AB}$ and $\underline{BC}$--;
    Line 14, "BC with CD" should read --$\underline{BC}$ with $\underline{CD}$--;
    Line 22, "or" should read --of--;
    Line 45, "emperically." should read --empirically.--;
    Line 51, "AB, BC" should read --$\underline{AB}$, $\underline{BC}$--;
    Line 52, "CD" should read --$\underline{CD}$--;
    Line 57, "AB with BC and BC" should read
        $\underline{AB}$ with $\underline{BC}$ and $\underline{BC}$--; and
    Line 58, "CD." should read --$\underline{CD}$.--.

COLUMN 10

Line 12, "occurences of polgons" should read
        --occurrences of polygons--;
    Line 29, "situatation, the outer" should read
        --situation, the outermost--;
    Line 30, "most" should be deleted.
    Line 43, "other" should read --others--;
    Line 50, "modes" should read --nodes--;
    Line 54, "proceed" should read --proceeds--; and
    Line 55, "coplaner" should read --coplanar--.

UNITED STATES PATENT AND TRADEMARK OFFICE
CERTIFICATE OF CORRECTION

PATENT NO. : 5,771,341
DATED : June 23, 1998
INVENTOR(S) : RICHARD STIRLING HUDDY It is certified that error appears in the above-identified patent and that said Letters Patent is hereby corrected as shown below:

COLUMN 11

Line 5, "polygon. by." should read --polygon by--; and
    Line 43, "sub-division" should read --subdivisions--.

COLUMN 12

Line 16, "defined" should read --defined by--;
    Line 24, "ante" should read --angle--;
    Line 64, "Hezier" should read --Bezier--
        and "bavina" should read --having--; and
    Line 67, "Rezier" should read --Bezier--.

COLUMN 13

Line 13, "curves" should read --curve--.

Signed and Sealed this

Fourth Day of May, 1999

*Attest:*

Q. TODD DICKINSON

*Attesting Officer*     Acting Commissioner of Patents and Trademarks

UNITED STATES PATENT AND TRADEMARK OFFICE
CERTIFICATE OF CORRECTION

PATENT NO. : 5,771,341

DATED : June 23, 1998

INVENTOR(S): RICHARD STIRLING HUDDY

Page 1 of 2

It is certified that error appears in the above-identified patent and that said Letters Patent is hereby corrected as shown below:

ON COVER PAGE AT [56], OTHER PUBLICATIONS

"Yong et al,"On Mapping Bezier Curves and Surface Subdivision Algorithm with Adjacent Constraint Parallel", Parallel Processing & Distributed Proc. 1991."

should read

--Yang et al, "On Mapping Bézier Curve and Surface Subdivision Algorithms into a Hypercube with Geometric Adjacency Constraint", Parallel Processing & Distributed Proc. 1991.--.

ON COVER PAGE AT [56], OTHER PUBLICATIONS

Add, --"Computer Graphics Principles & Practice", Second Edition, by Foley, van Dam, Feiner & Hughes; Addison-Wesley Publishing Company, 1990, pages 510-529.--.

UNITED STATES PATENT AND TRADEMARK OFFICE
CERTIFICATE OF CORRECTION

PATENT NO. : 5,771,341

DATED : June 23, 1998

INVENTOR(S): RICHARD STIRLING HUDDY

It is certified that error appears in the above-identified patent and that said Letters Patent is hereby corrected as shown below:

COLUMN 8

Line 6, the correction made by the Certificate of Correction dated May 4, 1999 should read --

Line 7, "AB" (second occurrence) should read --AB--.

COLUMN 13

Line 13, "curve" (see correction made by Certificate of Correction dated May 4, 1999) should read --curve,--.

COLUMN 14

Line 60, "comprise s she" should read --comprises the--.

Signed and Sealed this

Eleventh Day of January, 2000

Attest:

Q. TODD DICKINSON

*Attesting Officer*     *Acting Commissioner of Patents and Trademarks*